United States Patent

[11] 3,622,520

| [72] | Inventor | John C. Hayes |
| --- | --- | --- |
| | | Palatine, Ill. |
| [21] | Appl. No. | 844,200 |
| [22] | Filed | July 23, 1969 |
| [45] | Patented | Nov. 23, 1971 |
| [73] | Assignee | Universal Oil Products Company |
| | | Des Plaines, Ill. |
| | | Continuation-in-part of application Ser. No. 805,380, Mar. 7, 1969. This application July 23, 1969, Ser. No. 844,200 |

[54] REGENERATION OF A COKE-DEACTIVATED CATALYST COMPRISING A COMBINATION OF PLATINUM, RHENIUM, HALOGEN AND SULFUR WITH AN ALUMINA CARRIER MATERIAL
12 Claims, No Drawings

| [52] | U.S. Cl. | 252/415, 208/140, 252/419 |
| --- | --- | --- |
| [51] | Int. Cl. | C10g 35/06, B01j 11/02 |
| [50] | Field of Search | 252/415, 419; 208/140 |

[56] References Cited
UNITED STATES PATENTS

| 2,785,138 | 3/1957 | Milliken, Jr. | 252/415 |
| --- | --- | --- | --- |
| 2,853,435 | 9/1958 | Evering et al. | 208/140 X |
| 2,870,085 | 1/1959 | Love | 208/140 |
| 2,916,440 | 12/1959 | Hogin et al. | 208/140 |
| 3,243,384 | 3/1966 | Raarup, Jr. | 252/415 |
| 3,296,118 | 1/1967 | Czajkowski | 208/139 X |
| 3,407,135 | 10/1968 | Brown | 252/415 X |
| 3,496,096 | 2/1970 | Kluksdahl | 252/415 X |

FOREIGN PATENTS

| 1,044,045 | 11/1958 | Germany | 252/415 |
| --- | --- | --- | --- |

*Primary Examiner*—Daniel E. Wyman
*Assistant Examiner*—P. E. Konopka
*Attorneys*—James R. Hoatson, Jr. and Thomas K. McBride ABSTRACT: A deactivated hydrocarbon conversion catalyst, which is a combination of a platinum group component, a rhenium component, a halogen component, and a sulfur component with an alumina carrier material and which has been deactivated by deposition of carbonaceous material thereon during a previous contacting with a hydrocarbon charge stock at hydrocarbon conversion conditions, is regenerated by the sequential steps of: (1) stripping the sulfur therefrom by contacting with a first gaseous mixture comprising hydrogen, $H_2O$, and HCl; (2) purging hydrogen from contact with the catalyst with an inert gas stream; (3) burning carbon from the resulting catalyst at a relatively low temperature with a substantially sulfur-free second gaseous mixture containing relatively small amounts of oxygen, $H_2O$, and HCl; (4) treating the resulting catalyst with the second gaseous mixture at a relatively high temperature; (5) purging oxygen from contact with the catalyst with an inert gas stream; and (6) reducing the resulting catalyst by contacting with a substantially sulfur-free third gaseous mixture comprising hydrogen, $H_2O$, and HCl. Key feature of the subject regeneration method involves the use of both $H_2O$ and HCl in the gaseous mixtures used in the four major steps thereof (i.e., steps (1), (3), (4), and (6)). Furthermore, in all of these steps the mole ratio of $H_2O$ to HCl in the gas streams is maintained at a value selected from the range of about 20:1 to about 100:1.

3,622,520

REGENERATION OF A COKE-DEACTIVATED CATALYST COMPRISING A COMBINATION OF PLATINUM, RHENIUM, HALOGEN AND SULFUR WITH AN ALUMINA CARRIER MATERIAL

CROSS-REFERENCE TO RELATED APPLICATION

This application is a continuation-in-part of my copending application, Ser. No. 805,380 filed Mar. 7, 1969. The subject of the present invention is a method for regenerating a coke-deactivated hydrocarbon conversion catalyst comprising a combination of a platinum group component, a rhenium component, a halogen component, and a sulfur component with an alumina carrier material. Typically, the catalyst has been deactivated by the deposition of carbonaceous materials thereon during a previous contacting with a hydrocarbon charge stock at an elevated temperature. In essence, the present invention provides a specific sequence of carbon-burning and catalyst-treatment steps which are all conducted with gas streams containing $H_2O$ and $HCl$ in a mole ratio of about 20:1 to about 100:1 and which are specifically designed to result in a regenerated catalyst possessing activity, selectivity, and stability characteristics which are equivalent to those observed with a fresh, undeactivated catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as one or more of the metals or compounds of metals of Group V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this latter type of process is reforming wherein a hydrocarbon feed stream containing paraffins and naphthenes is subjected to conditions which promote dehydrogenation of naphthenes to aromatics, isomerization of paraffins and naphthenes, hydrocracking of naphthenes and paraffins and the like reactions, to produce an octane-rich and aromatic-rich product stream. Another example is a hydrocracking process wherein catalyst of this type are utilized to effect selective hydrogenation and the cracking of high molecular weight unsaturated materials selective hydrocracking of high molecular weight materials, and other like reactions, to produce a generally lower boiling, more valuable output stream. Yet another example is an isomerization process where in a hydrocarbon fraction which is relatively rich in straight-chain paraffins components is contacted with a dual-function catalyst to produce an output stream rich in isoparaffin compounds.

Regardless of the reaction involved or the particular process involved, it is of critical importance that the dual-function catalyst exhibit not only the capability to initially perform the specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants converted; (3) stability refers to the rate of change with the time of the activity and selectivity parameters—obviously the smaller rate implying the more stable catalyst. In a reforming process, for example, activity commonly refers to the amount of conversion that takes place for a given charge stock at a specified severity level and is typically measured by octane number of $C_5+$ product stream; selectivity refers to the amount of $C_5+$ yield that is obtained at the particular severity level; and stability is typically equated to the rate of change with time of activity, as measured by octane number of $C_5+$ product and of selectivity as measured by $C_5+$ yield. Actually, the last statement is not strictly correct because generally a continuous reforming process is run to produce a constant octane $C_5+$ product with a severity level being continuously adjusted to attain this result; and, furthermore, the severity level is for this process usually varied by adjusting the conversion temperature in the reaction zone so that, in point of fact, the rate of change of activity finds response in the rate of change of conversion temperature and changes in this last parameter are customarily taken as indicative of activity stability.

As is well known to those skilled in the art, the principal cause of observed deactivation or instability of these dual-function catalysts, when they are used in a hydrocarbon conversion process, is associated with the formation of coke or carbonaceous materials on the surface of the catalyst during the course of the reaction. More specifically, the conditions utilized in these hydrocarbon conversion processes typically result in the formation of heavy, black, solid or semisolid carbonaceous material which deposit on the surface of the catalyst and gradually reduce its activity by shielding its active sites from the reactants. Recently, there has been developed a new dual-function catalytic composite which possesses improved activity, selectivity, and stability characteristics when it is employed in a process for the conversion of hydrocarbons of the type which has heretofore utilized dual-function catalytic composites such as processes for isomerization dehydrogenation, hydrogenation, alkylation, transalkylation, dealkylation, cyclization, dehydrocyclization, cracking, hydrocracking, reforming, and the like processes. In particular, it has been determined that a combination of a platinum group component, a rhenium component, and a halogen component with an alumina carrier material enables the performance of hydrocarbon conversion processes utilizing dual-function catalysts to be substantially improved. For example, it has been demonstrated that the overall performance characteristics of a reforming process can be sharply improved by the use of this recently developed catalytic composite. Not unexpectedly, the deactivation of this recently developed dual-function hydrocarbon conversion catalyst occurs in much the same manner as for any other hydrocarbon conversion catalyst having a platinum metal component when it is employed in the hydrocarbon conversion service. Accordingly, the principal mode of deactivation of this recently developed catalyst is the deposition of coke, volatile hydrocarbons, and other carbonaceous material on the surface of the catalyst which eventually cover the catalytically active sites of the catalyst thereby shielding them from the reactants or blocking access of the reactants to the sites. These deposits cause a gradual decline in activity and selectivity of the catalyst and a gradual loss of its capability to perform its intended function. Depending somewhat on the performance requirements imposed on the process utilizing the catalyst, at some point in time the catalyst becomes so clogged with carbonaceous materials that it either must be regenerated or discarded. Heretofore, substantial difficulty has been encountered in regenerating this recently developed hydrocarbon conversion catalyst. More specifically, it has been determined that the application of conventional regeneration techniques, which have been practiced in the art of regenerating dual-function hydrocarbon conversion catalysts, has not been successful in restoring the initial activity, selectivity, and stability characteristics of the catalyst. Typically, attempts at regeneration of this catalyst by a conventional carbon-burning procedure with an oxygentcontaining gas has resulted in a regenerated catalyst having an extremely low activity for the conversion of hydrocarbons, and containing a substantially reduced amount of halogen. Attempts at restoring the initial level of halogen contained in the catalyst by well known halogen-adjustment procedures on the regenerated catalyst have been uniformly unsuccessful. When the deactivated catalyst also contains a sulfur component, I have now found that this regeneration problem is greatly magnified and compounded. More specifically, when this recently developed catalyst has been exposed to contact with sulfur or sulfur-containing compounds, either because of presulfiding, because of the presence of sulfur in the charge stock, or because of upsets in a treating process used on the charge stock therefor, the response of the resulting sulfur-containing catalyst to a conventional carbon-burning regeneration procedure is completely negative, and the catalyst is thereby permanently deactivated. In other words, this catalyst is acutely sensitive to the procedure used to regenerate even when it does not contain sulfur, and when sulfur is present, the already difficult regeneration problem increases by an order of magnitude. This discussion of the regeneration problem caused by sulfur is not to be construed as an allegation that the presence of sulfur in the charge stock causes a mode of catalyst deactivation which is independent of the carbon deposition mode explained previously; quite on the contrary, the presence of sulfur in the charge stock can in some cases be highly beneficial. Upon investigation, it appears that the adverse effect of sulfur is primarily associated with the production during regeneration of sulfur oxides which are preferentially retained by the catalyst.

Based upon my recognition of the acute sensitivity of this catalyst to the presence of sulfur or sulfur oxides during the course of the regeneration procedure, I previously determine that a particularly advantageous method of regeneration involves the substantially complete removal of sulfur from this catalyst prior of the burning of carbon therefrom, coupled with careful control of the gas streams used in the various steps of the regeneration method to exclude therefrom sulfur or sulfur oxides. I have now additionally found that it is particularly beneficial to conduct each of the major steps of the regeneration method with gas streams containing both $H_2O$ and HCl in a mole ratio of $H_2O$ to HCl selected from the range of about 20:1 to about 100:1. More precisely, I have now found a specific sequence of steps which enables the successful regeneration of this sulfur-containing catalyst, and essential features of my method are: substantially complete removal of sulfur prior to burning of any carbon from the catalyst; careful control of the temperature of the catalyst throughout the regeneration steps; exclusion of sulfur or sulfur oxides from the gas streams used in all steps; presence of both $H_2O$ and HCl in the gas streams used in the major steps thereof (i.e., the sulfur-stripping step, the carbon-burning step, the oxygen treatment step, and the final reduction step) in amounts sufficient to achieve a mole ratio of $H_2O$ to HCl of about 20:1 to about 100:1; and use of relatively small amount of oxygen in the carbon-burning and oxygen-treating steps.

It is, therefore, a principal object of the present invention to provide a method for regenerating a hydrocarbon conversion catalyst comprising a combination of a platinum group component, a rhenium component, a halogen component, and a sulfur component with an alumina carrier material, which catalyst has been deactivated by contact with a hydrocarbon charge stock at elevated temperatures. A corollary object is to provide a solution to the problem of regenerating this sulfur-containing catalyst which solution enables the substantial restoration of the activity, selectivity, and stability characteristics of the original catalyst. An overall object is to extend the total catalyst life of these recently developed catalysts and to obtain more efficient and effective use of these catalysts during their active life.

In brief summary, one embodiment of the present invention involves a method for regenerating a deactivated hydrocarbon conversion catalyst comprising a combination of a platinum group component, a rhenium component, a halogen component, and a sulfur component with a alumina carrier material. The catalyst also contains a carbon component which was formed by deposition of carbonaceous material thereon during a previous contacting with a hydrocarbon charge stock at an elevated temperature. The first step of the method involves contacting the deactivated catalyst with a substantially sulfur-free first gaseous mixture comprising hydrogen, $H_2O$ and HCl at a temperature of about 350° to about 600° C. and at a pressure of about 1 to about 50 atmospheres for a period extending until the resulting effluent gas stream is substantially free of hydrogen sulfide. This first gaseous mixture contains $H_2O$ and HCl in amounts selected to result in a mole ratio of $H_2O$ to HCl of about 20:1 to about 100:1. Thereafter, hydrogen is purged from contact with the catalyst and it is subjected to contact with a substantially surfur-free second gaseous mixture containing $O_2$, $H_2O$, and HCl at a temperature of about 375° to about 450° C. and at a pressure of about 1 to 7 atmospheres for a period of time sufficient to substantially remove the carbonaceous materials from the catalyst. Like the first mixture, this second gaseous mixture contains $H_2O$ and HCl in amounts selected to result in a mole ratio of $H_2O$ to HCl of about 20:1 to about 100:1; in addition, the amount of $O_2$ contained therein is about 0.2 to about 3 mole percent thereof. After carbon is substantially removed from the catalyst, it is subjected to a treatment step involving contacting it with the second gaseous mixture for a period of about 0.5 to about 10 hours at a relatively high temperature of about 450° to about 550° C. and at a pressure of about 1 to about 7 atmospheres. Following this oxygen treatment step, oxygen is purged from contact with the catalyst with the inert gas stream. Thereafter, the catalyst is subjected to contact with a substantially sulfur-free third gaseous mixture comprising hydrogen, $H_2O$, and HCl at a temperature of about 300° to about 600° C. for a final period of about 0.5 to about 5 hours. Once again, this third gaseous mixture contains $H_2O$ and HCl in amounts sufficient to result in a mole ratio of $H_2O$ to HCl of about 20:1 to about 100:1. The regenerated catalyst recovered from this last step has activity, selectivity, and stability characteristics equivalent to those possessed initially by the fresh catalyst.

Some of the advantages associated with this method of catalyst regeneration are: (1) it does not require a high concentration of oxygen in the gas stream used during the oxygen treatment step; (2) since all major steps are performed in the presence of water, expensive dryers and/or elaborate drying procedures are not necessary; (3) fairly low temperatures can be utilized in the reduction step; (4) the presence of chloride in the gas streams utilized in all of the major steps insures the automatic adjustment of the halogen component of the catalyst to the proper level; and, (5) the positive requirements for exclusion of sulfur from the gas streams utilized in each of these steps coupled with the initial sulfur-stripping step eliminates the possibility of damaging the catalyst due to exposure of sulfur or sulfur oxides as previously explained.

In a second embodiment, the present invention is a regeneration method as summarized above in the first embodiment wherein the oxygen-treating step comprises the substeps of: (a) treating the catalyst resulting from the carbon-burning step with the second gaseous mixture for about 0.5 to about 5 hours at a temperature of about 450° to about 550° C. and at a pressure of about 1 to about 7 atmospheres; and thereafter, (b) increasing the amount of $O_2$ contained in the second gaseous mixture by a factor of about 2 and continuing the treating with this modified mixture for an additional period of about 0.5 to about 5 hours at the same temperature and pressure.

One preferred embodiment relates to the regeneration method described in the first embodiment wherein the ratio of $H_2O$ to HCl utilized in the sulfur-stripping step, the carbon-burning step, the oxygen-treatment step and the reduction step is selected from the range of about 50:1 to about 90:1, wherein the amount of water contained in these various gaseous mixtures used in these steps comprises about 0.5 to about 2 mole percent thereof, and wherein the amount of oxygen contained in the second gaseous mixture is about 0.5 to about 1.5 mole percent thereof.

Other objects and embodiments of the present invention encompass further details about the catalysts that can be regenerated thereby, the conditions and reagents used in each step of the regeneration method, and the mechanics associated with each of these steps. These embodiments and objects will be hereinafter disclosed in the following detailed description of each of the essential and preferred steps of the present invention.

The present invention encompasses a regeneration method which is applicable to a catalyst containing a platinum group component, a rhenium component, a halogen component and a sulfur component combined with an alumina carrier material. Although the regeneration procedure is specifically directed to the regeneration of a composite containing platinum, it is intended to include within its scope other platinum group metals such as palladium, rhodium, ruthenium, osmium, and iridium. The platinum group component may be present in the catalyst as the elemental metal or as a suitable compound such as the oxide, sulfide, etc., although it is generally preferred that it be used in the reduced state. Generally, the amount of the platinum group metallic component present in the final catalyst is small compared to the quantities of the other components combined therewith. In fact, the platinum group metallic component preferably comprises about 0.01 to about 1 wt. percent of the final catalytic composite calculated on an elemental basis. Excellent results are obtained when the catalyst contains about 0.1 to about 0.9 wt. percent of the platinum group metal. The preferred platinum group component is platinum or a compound of platinum.

Another essential constituent of the catalyst regenerated by the method of the present invention is the rhenium component. This component may be present as an elemental metal or as a chemical compound such as the oxide, sulfide, halide, or in a physical or chemical association with the carrier material and/or other components of the catalyst. Generally, the rhenium component is utilized in an amount sufficient to result in the final catalytic composite containing about 0.01 to about 1 wt. percent rhenium, calculated as an elemental metal. The rhenium component may be incorporated in the catalytic composite in any simple manner and in any stage of the preparation of the catalyst. The preferred procedure for incorporating the rhenium component involves the impregnation of the alumina carrier material either before, during or after the other components referred to herein are added. The impregnation solution is generally an aqueous solution of a suitable rhenium salt such as ammonium perrhenate, sodium perrhenate, potassium perrhenate, and the like salts. However, the preferred impregnation solution is an aqueous solution of perrhenic acid. The alumina carrier material can, in general, be impregnated with the rhenium component either prior to, simultaneously with, or after the platinum group metallic component is added to the carrier. Best results are achieved when the rhenium compound is impregnated simultaneously with the platinum group metallic component. In fact, a preferred impregnation solution contains chloroplatinic acid, hydrogen chloride, and perrhenic acid.

Yet another essential component of the subject catalyst is a halogen component. Although the precise form of the chemistry of the association of the halogen component with the alumina support is not entirely known, it is customary in the art to refer to the halogen component as being combined with the alumina carrier material or with the other ingredients of the catalyst. This combined halogen, may be either chlorine, fluorine, iodine, bromine, or mixtures thereof. Of these, chlorine and fluorine are preferred with the best results obtained with chlorine. The halogen may be added to the alumina carrier material in any suitable manner either during preparation of the support or before or after the addition of the platinum metal and rhenium components. The halogen component is typically combined with the alumina carrier material in amounts sufficient to result in the final catalyst containing about 0.1 to about 1.5 wt. percent halogen and preferably about 0.7 to about 1.2 wt. percent halogen.

As indicated above, the catalyst which is regenerated by the subject method also contains a sulfur component. A portion of this sulfur component may be derived from sulfur incorporated in the catalyst during a presulfiding operation with a suitable sulfur-containing compound such as hydrogen sulfide. Another source of the sulfur contained in the catalyst is the presence of sulfur or sulfur-containing compounds in the charge stock which is contacted with the subject catalyst at conversion conditions. Even in the best run plants, some sulfur may also be derived from plant hardware due to previous exposure of same to hydrogen sulfide. In some cases, sulfur may be deliberately injected into the hydrocarbon conversion process utilizing this catalyst in order to selectively poison same. Regardless of the source of sulfur, the catalyst regenerated by the method of the present invention will contain about 0.01 to about 5 wt. percent sulfur, and, more commonly, about 0.05 to 1 wt. percent sulfur, when it is subjected to the method disclosed herein.

The catalyst regenerated by the method disclosed herein also contains an alumina carrier material. The alumina material is typically a porous, adsorptive, high surface area support having a surface area of about 25 to about 500 or more m.$^2$/g. suitable alumina materials are the crystalline aluminas known as gamma-, eta-, and theta-alumina, with gamma- or eta-alumina giving best results, In addition, in some embodiments the alumina carrier material may contain minor proportions of other well known refractory inorganic oxides such as silica, zirconia, magnesia, etc. However, the preferred carrier material consists essentially of gamma- or eta-alumina; in fact, an especially preferred alumina carrier material has an apparent bulk density of about 0.30 g./cc. to about 0.70 g./cc. surface area characteristics such that the average pore diameter is about 20 to about 300 Angstroms, pore volume is about 0.10 to about 1.0 ml./g. and the surface area is about 100 to about 500 m.$^2$/g. An exemplary procedure for preparing a preferred alumina carrier material comprising spherical particles of relatively small diameter is given in the teachings of U.S. Pat. No. 2,620,314.

After impregnation of the catalytic components into the alumina carrier material, the resulting composite is typically subjected to a conventional drying step at a temperature of about 200° to about 600° F. for a period of about 2 to 24 hours. Thereafter, the dried composite is typically calcined at a temperature of about 700° to about 1,100° F. in an airstream for a period of about 0.5 to 10 hours. Moreover, conventional prereduction and presulfiding treatments are typically performed in the preparation of catalytic composites which are regenerated by the method of the present invention. In fact, it is preferred to incorporate about 0.05 to about 0.5 wt. percent of sulfur component into the subject catalyst by a conventional presulfiding step.

In one preferred embodiment, the catalyst regenerated by the present invention is a combination of a platinum component, a chlorine component, a rhenium component, and a sulfur component with an alumina carrier material. These components are preferably present in amounts sufficient to result in the catalyst containing, on an elemental and carbon-free basis, about 0.1 to 1.5 wt. percent chlorine, about 0.01 to about 1 wt. percent platinum, about 0.01 to about 1 wt. percent rhenium, and about 0.05 to about 1 wt. percent sulfur.

As indicated hereinbefore, the principal utility for subject catalyst is in a hydrocarbon conversion process wherein a dual-function hydrocarbon conversion catalyst having a hydrogenation-dehydrogenation function and an acid-acting function has been traditionally used; for example, these catalysts are used in a reforming process with excellent results.

In a typical reforming process, a hydrocarbon charge stock boiling in the gasoline range and hydrogen are contacted with the catalyst of the type described above in a conversion zone at reforming conditions. The hydrocarbon charge stock will typically comprise hydrocarbon fractions containing naphthenes and paraffins that boil within the gasoline range. The preferred class of charge stocks include straight run gasolines, natural gasolines, synthetic gasolines, etc. The gasoline charge stock may be a full boiling range gasoline having an initial boiling point of about 50° to about 150° F., and an end boiling point within the range of about 325° to 425° F., or it may be a selective fraction thereof which generally will be a higher boiling fraction commonly referred to as a heavy naphtha—for example, a naphtha boiling in the range of $C_7$ to 400° F. provides an excellent charge stock. In general, the conditions used in the reforming process are: a pressure of about 50 to about 1000 p.s.i.g. with the preferred pressure being 100 to about 600 p.s.i.g., a temperature of about 800° to about 1,100° F. and preferably about 900° to about 1,050° F., a hydrogen to hydrocarbon mole ratio of about 2 to about 20 moles of $H_2$ per mole of hydrocarbon and preferably about 4 to about 10 moles of $H_2$ per mole of hydrocarbon, and a liquid hourly space velocity (which is defined as the equivalent liquid volume flow rate per hour of the hydrocarbon charge stock divided by the volume of the bed of catalyst particles) of about 0.1 to about 10 hr.$^{-1}$, with a value in the range of about 1 to about 3 hr.$^{-1}$ giving best results.

When the catalysts of the type described above are employed in the conversion of hydrocarbons, particularly the reforming process outlined above, the activity, selectivity, and stability of these catalysts are initially quite acceptable. For example, in a reforming process this type of catalyst has several singular advantages, among which are increased $C_5+$ yield, decreased rate of coke laydown on the catalyst, increased hydrogen make, enhanced stability of both $C_5+$ yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about one-half to about 25 percent by weight of carbonaceous deposits have been formed upon the catalyst.

When the performance of the catalyst has decayed to the point where it is desired to regenerate the catalyst, the introduction of the hydrocarbon charge stock into the conversion zone containing the catalyst is typically stopped. Thereafter, the regeneration method of the present invention is performed either in a situ or the catalyst may be unloaded from the conversion zone and regenerated in an off-line facility.

It is to be carefully noted that it is an essential feature of the subject regeneration method that the composition of the gas stream used in the various steps thereof are carefully controlled. In particular, it is a critical feature of the present invention that the gas streams used during the sulfur-stripping step, the carbon-burning step, the oxygen-treating step, and the reduction step are substantially free of compounds of sulfur—particularly, oxides of sulfur and $H_2S$. It is, therefore, evident that the gas streams used in each of the steps of the present invention may be once-through streams or recycle streams; provided that in this latter case, the recycle streams are treated by conventional techniques to insure the absence of detrimental constituents therefrom. Furthermore, it is to be noted that the temperatures given hereinafter for each of the steps refer to the temperature of the gas stream used therein just before it contacts the catalyst, and that the composition of the gas streams utilized are given in mole percent which are, of course, substantially the same as when expressed in volume percent.

According to the present invention, the first step of the regeneration method involves subjecting the deactivated catalyst to contact with a substantially sulfur-free first gaseous mixture comprising hydrogen, $H_2O$, and HCl at conditions selected to strip sulfur from the catalyst and associated hardware of the hydrocarbon conversion plant. This first gaseous mixture contains $H_2O$ and HCl in amounts, respectively, sufficient to result in a mole ratio of $H_2O$ to HCl of about 20:1 to about 100:1 with best results ordinarily obtained at a mole ratio of about 50:1 to about 90:1. In general, it is preferred to operate with a relatively minor amount of water in this first gaseous mixture with best results obtained when the amount of water contained therein is sufficient to comprise about 0.5 to about 2 mole percent thereof, although in some cases higher amounts of water may be utilized if the essential restriction given above with respect to mole ratio is observed. Accordingly, in a preferred mode of operation, the first gaseous mixture consists essentially of a hydrogen stream containing about 0.5 to about 2 mole percent water and about 0.005 to about 0.1 mole percent HCl. It is to be noted, both herein and in the subsequent steps, that when reference is made to HCl being contained in the gas streams, it is intended to include both the situation where HCl per se is added to the gas streams and where a chloride-containing compound, which is convertible to hydrogen chloride under the conditions utilized in these steps, is added to these gas streams. Examples of the last compounds are chlorine, alkyl chlorides, ammonium chloride, carbon tetrachloride, and the like compounds.

This sulfur-stripping step is preferably conducted at a relatively high temperature of about 350° to about 600° C., with best results obtained at about 400° to 550° C. Similarly, the pressure utilized is about 1 to about 50 atmospheres, with best results obtained when a relatively high pressure is utilized in conjunction with a relatively high temperature. Likewise, the gas hourly space velocity can be selected from a relatively broad range, with a preferred value generally being about 100 to 25,000 hr.$^{-1}$. This sulfur-stripping step is performed for a period extending until the resulting effluent gas stream is substantially free of hydrogen sulfide: that is, less than about 10 vol. p.p.m. and preferably less than 1 Vol. p.p.m. The hydrogen stream utilized in this step can be a once-through stream or a recycle stream provided, in the latter case, suitable arrangements are made to scrub $H_2S$ from the recirculated gas stream. An acceptable scrubbing procedure involves, for example, contacting the effluent gas stream with a strong basic solution such as an aqueous solution of an alkali metal or alkaline earth salt of a weak acid. A preferred scrubbing procedure for this step and subsequent steps involve scrubbing with a solution of sodium hydroxide which is maintained at a pH of about 11. In a commercial hydrocarbon conversion plant, this scrubbing operation can easily be performed by circulating a basic solution from the hydrogen separator to the inlet to the effluent cooling means with suitable addition of fresh solution and withdrawal of spent solution to maintain the desired pH level.

This sulfur-stripping step is to be sharply distinguished from the conventional volatile hydrocarbon-stripping step which is ordinarily performed during the shutdown procedure when the catalyst has deactivated and is taken off stream. It is customary for platinum metal-containing catalysts to perform this volatile hydrocarbon-stripping step with a hydrogen-containing stream; however, the function of this stripping step is to remove volatile hydrocarbons and it is terminated when the effluent gas stream becomes free of same. Thus, this conventional stripping step ordinarily is completed in about 0.5 to about 2 hours. In sharp contrast, the sulfur-stripping step required by the present invention lasts until the sufficient gas stream is substantially free of hydrogen sulfide, which is ordinarily a much longer period of about 15 to 30 hours, depending upon the exact stripping conditions utilized and the amount of sulfur initially on the catalyst.

Although it is not particularly preferred, an alternative mode of operation of this sulfur-stripping step involves contacting a substantially sulfur-free mixture of hydrogen, $H_2O$, HCl, and charge stock with the sulfur-containing catalyst at conditions selected to convert hydrocarbons and to strip sulfur. This contacting is usually performed with recycle gas scrubbing, as explained hereinbefore, for a period of time extending until the effluent stream from this contacting step is substantially free of hydrogen sulfide; that is, less than about 10 vol. ppm. and preferably less than 1 vol. ppm.

Following this sulfur-stripping step, residual hydrogen is removed from contact with the resulting catalyst by purging with an inert gas such as nitrogen. A preferred mode of operation for this purging step involves use of an inert gas stream that contains $H_2O$ and HCl in a mole ratio of about 20:1 to about 100:1.

After hydrogen is purged from contact with the catalyst, the next step involves burning carbon or coke from the resulting catalyst. This involves subjecting the sulfur-stripped catalyst to contact with a substantially sulfur-free second gaseous mixture containing oxygen, $H_2O$, and HCl at carbon-burning conditions. Preferably, the amount of oxygen contained in the second gaseous mixture is maintained within the range of about 0.2 to about 3 mole percent thereof with best results obtained when it is about 0.5 to about 1.5 mole percent thereof. Similarly, it is necessary to maintain the mole ratio of $H_2O$ to HCl contained in this second gaseous mixture within the range of about 20:1 to about 100:1, with best results obtained at a ratio of about 50:1 to about 90:1. In addition, the amount of water contained in this second gaseous mixture preferably comprises about 0.5 to about 2 mole percent thereof. The balance of the gaseous mixture is an inert gas such as nitrogen, helium, carbon dioxide, etc. The conditions utilized in this carbon-burning step are: a temperature of about 375° to about 450° C., a pressure sufficient to maintain the flow of this second gaseous mixture through the zone containing the catalyst and preferably about 1 to about 7 atmospheres, and a gas hourly space velocity (defined as the volume rate of flow of the gas stream per hour at standard conditions divided by the volume of the catalyst bed) of about 100 to about 25,000 hr.$^{-1}$. This carbon-burning step is performed for a time period sufficient to substantially remove carbonaceous materials from the catalyst. In general, depending obviously upon the amount of carbonaceous materials present on the catalyst, a carbon-burning period of about 5 to about 30 hours is adequate with best results typically obtained in about 20 to about 30 hours. A convenient criterion for determining when this carbon-burning step is essentially complete involves monitoring the $\Delta T$ across the reactor containing the catalyst, when this parameter is less than about 5° C. then the carbon-burning step for this reactor can be considered finished. For a multireactor system, the $\Delta T$ across the last reactor in series would be the controlling parameter.

The next essential step of the regeneration method of the present invention involves treating the catalyst resulting from the carbon-burning step with the second gaseous mixture for a fourth period of about 0.5 to about 10 hours at a relatively high temperature. The temperature utilized in this second step is selected from the range of about 450° to about 550° C. The other conditions are preferably selected from the ranges previously given in the discussion of the carbon-burning step. A preferred embodiment involves conducting this treatment step in two substeps: the first substep involving treating the catalyst resulting from the carbon-burning step with the second gaseous mixture for a period of about 0.5 to about 2.5 hours at a temperature of about 450° to about 550° C. and at a pressure of about 1 to about 7 atmospheres. The second substep then involves increasing the amount of oxygen contained in the second gaseous mixture by a factor of about 2 and thereafter continuing the treating with this modified gaseous mixture for a period of about 0.5 to about 2.5 condition, hours at the same temperature and pressure. The function of this oxygen-treating step is to remove trace amounts of carbonaceous materials which were not burned off during the first step and to convert the metallic components of the catalyst (i.e. the platinum group and rhenium components) to a highly oxidized state.

After this oxygen-treating step, oxygen is purged from contact with the resulting catalyst by means of a suitable inert gas stream. In view of the fact that the subsequent reduction step is conducted under a wet y condition, it is not necessary to dry the plant during this step. All that is necessary is to displace oxygen from contact with the catalyst, and the period of time necessary to do this can easily be determined by monitoring the effluent gas stream from the zone containing the catalyst.

Upon completion of this last purge step, the final essential step of the regeneration method is commenced. It involves contacting the resulting catalyst with a substantially sulfur-free third gaseous mixture comprising hydrogen, $H_2O$, and HCl at a temperature of about 300° to about 600° C., with best results obtained at a relatively low temperature of 325° to 425° C., for a final period of about 0.5 to about 5 hours. As in the prior steps, the amounts of $H_2O$ and HCl in this third gaseous mixture are selected so that the mole ratio of $H_2O$ to HCl is about 20:1 to about 100:1, with best results obtained at about 50:1 to about 90:1. Similarly, the amount of $H_2O$ contained in this third gaseous mixture is preferably about 0.5 to about 2 mole percent thereof. In some cases, it is beneficial to conduct this reduction step in two substeps: the first involving a relatively low partial pressure of $H_2$ of about 0.5 to about 2 atmospheres, and the second involving a relatively high partial pressure of $H_2$ of about 5 to about 10 atmospheres. Once again, the pressure and gaseous flow rates utilized for this step are preferably identical to those given in conjunction with the discussion of the carbon-burning step. The purpose of this reduction step is to reduce the metallic components essentially to an elemental state, thereby producing a regenerated catalyst having activity, selectivity, and stability characteristics comparable to those possessed initially by the fresh catalyst.

Following this reduction step, the hydrocarbon conversion process in which the catalyst is utilized may be restarted by once again charging the hydrocarbon stream in the presence of hydrogen to the zone containing the catalyst at conditions designed to produce the desired product. In the preferred case, this involves reestablishing reforming conditions within the zones containing the catalyst.

The following example is given to illustrate further the regeneration method of the present invention and to indicate the benefits that are gained by the utilization thereof. It is understood that the example is given for the sole purpose of illustration.

EXAMPLE

This example demonstrates the benefits associated with the regeneration method of the present invention by contrasting the results obtained in an accelerated reforming stability test with the fresh, undeactivated catalyst and with the regenerated catalyst produced by the present invention.

The catalysts were all manufactured using 1/16-inch spherical particles of a gamma-alumina carrier material prepared by the method disclosed in U.S. Pat. No. 2,620,314. The carrier material had an apparent bulk density of about 0.5 g./cc. a pore volume of about 0.4 cc./g. and a surface area of about 160 m.$^2$/g.

The spherical particles were then impregnated with a solution containing chloroplatinic acid, hydrogen chloride, and perrhenic acid in amounts sufficient to result in a final catalyst containing about 0.2 wt. percent Pt and about 0.2 wt. percent Re, calculated on an elemental basis. The impregnated spheres were then dried to about 250° F. for about 2 hours, and thereafter subjected to high temperature oxidation treatment with an airstream containing $H_2O$ and HCl for about 3 hours at 975° F.

After this oxidation treatment, the catalyst particles were contracted with a stream of substantially pure hydrogen (containing less than 1 vol. p.p.m. of water) at a temperature of about 1,020° F. for about 1 hour. Thereafter, the catalyst particles were presulfided with a mixture of $H_2$ and $H_2S$ at a temperature of about 1,000° F.

An analysis of the fresh catalyst is given in table I and its composition reported on a weight percent of element basis. Also shown in table I is an analysis of the same catalyst after it has been deactivated by the deposition of carbonaceous materials while being used in a reforming process in which it was exposed to contact with a gasoline fraction containing about 10 to about 18 p.p.m. of sulfur.

TABLE 1.—COMPOSITION OF CATALYSTS

| Catalyst | Weight percent [1] | | | | |
|---|---|---|---|---|---|
| | Pt | Re | Cl | S | C |
| Fresh | 0.2 | 0.2 | 0.85 | 0.1 | 0 |
| Deactivated | *0.2 | *0.2 | *0.85 | 0.4 | 3.74 |
| Regenerated | 0.2 | 0.2 | 1.14 | <0.1 | <0.1 |

*Based on carbon-free catalyst.

The deactivated catalyst was then regenerated by a sequence of steps which comprise a preferred embodiment of the present invention to yield the regenerated catalyst. A summary of the conditions and gas streams used in each of the steps is given in table II. In view of the fact that each of these steps has been previously explained in detail, the description thereof will not be repeated here; however, it is to be noted that, in all the steps the gas stream utilized was free of sulfur and compounds of sulfur.

TABLE II.—SUMMARY OF REGENERATION METHOD

| Step No. | Composition of gas stream, mole percent | T, °C. | GHSV, hrs.-1 | P, p.s.i.g. | Time, hrs. |
|---|---|---|---|---|---|
| 1 | 0.013% HCl, 1.0% H$_2$O and H$_2$ | 500 | 1,100 | 5 | 24 |
| 2 | 0.013% HCl, 1.0% H$_2$O and N$_2$ | 450 | 400 | 5 | 8 |
| 3 | 1.0% O$_2$, 0.013% HCl, 1.0% H$_2$O, and N$_2$ | 400 | 400 | 5 | 20 |
| 4A | do | 500 | 400 | 5 | 4 |
| 4B | 2.0% O$_2$, 0.013% HCl, 1.0% H$_2$O, and N$_2$ | 500 | 400 | 5 | 1 |
| 5 | N$_2$ | 370 | 400 | 5 | 1 |
| 6 | 0.004% HCl, 0.25% H$_2$O and H$_2$ | 370 | 1,100 | 5 | 2 |

The regenerated catalyst was then subjected to a high stress reforming stability test, and the results obtained compared with a similar test performed on the corresponding fresh catalyst.

The stability tests were performed in a laboratory scale reforming plant comprising a reactor containing a fixed bed of the catalyst, a hydrogen separator, a high surface area sodium dryer, a debutanizer column, and other conventional equipment such as pumps, compressors, heating and cooling means, etc., the details of which are well known to those skilled in the art.

The flow scheme utilized in this laboratory scale reforming plant is as follows: (1) the charge stock and hydrogen are commingled, heated to conversion temperature and passed into the reactor; (2) an effluent stream is withdrawn from the reactor, cooled to about 55° F., and passed to the hydrogen separator wherein a hydrogen-rich gas separates from a hydrocarbon liquid phase; (3) the hydrogen-rich gas phase is withdrawn and a portion API it vented from the system in order to maintain pressure control; another portion is passed through the high surface area sodium dryer, recompressed, and ultimately recycled to the reactor; and (4) the liquid phase from the separator is passed to the debutanizer column wherein light ends are taken overhead and a C$_5$+ reformate recovered as bottoms.

The characteristics of the charge stock used in the accelerated stability test are given in table III.

TABLE III

ANALYSIS OF HEAVY KUWAIT NAPHTHA

| | |
|---|---|
| API gravity at 60° F. | 60.4 |
| Initial boiling point, °F. | 184 |
| 10% boiling point, °F. | 205 |
| 50% boiling point, °F. | 256 |
| 90% boiling point, °F. | 321 |
| End boiling point, °F. | 360 |
| Sulfur, wt. p.p.m. | 0.5 |
| Nitrogen, wt. p.p.m. | 0.1 |
| Aromatics, vol. % | 8 |
| Paraffins, vol. % | 71 |
| Naphthenes, vol. % | 21 |
| Water, p.p.m. | 5.9 |
| Octane no., F-1 clear | 40.0 |

The reforming stability test consisted of six periods of 24 hours with a 12 hour line-out period being followed by a 12 hour test period. The conditions utilized in the tests were as follows: a pressure of 100 p.s.i.g., a mole ratio of hydrogen to hydrocarbon of 9:1, a LHSV of 1.5 hr.$^{-1}$ and a temperature which is continuously adjusted to achieve a target octane of 102 F-1 clear for the C$_5$+ reformate.

The results of these comparison tests are given in table IV in terms of temperature necessary during each period to achieve target octane, the excess recycle gas recovered from the hydrogen separator in standard cubic feet per barrel of charge (s.c.f.b.), the debutanizer overhead gas in s.c.f.b., the ratio of debutanizer gas to total gas make, the C$_5$+ yield on a vol. percent of charge basis, and the CH$_4$ make in s.c.f.b.

TABLE IV.—COMPARISON OF FRESH AND REGENERATED CATALYSTS IN ACCELERATED REFORMING STABILITY TEST

| Period number | 1 | 2 | 3 | 4 | 5 | 6 |
|---|---|---|---|---|---|---|
| Temperature, °F.: | | | | | | |
| Fresh | 968 | 978 | 988 | 996 | 1,004 | 1,007 |
| Regenerated | 964 | 973 | 980 | 986 | 994 | 999 |
| ERG, s.c.f.b.: | | | | | | |
| Fresh | 1,728 | 1,757 | 1,747 | 1,771 | 1,759 | 1,741 |
| Regenerated | 1,749 | 1,742 | 1,740 | 1,728 | 1,716 | 1,721 |
| DOH, s.c.f.b.: | | | | | | |
| Fresh | 86 | 91 | 90 | 89 | 88 | 89 |
| Regenerated | 92 | 88 | 90 | 87 | 88 | 91 |
| DOH, total gas make: | | | | | | |
| Fresh | 0.047 | 0.049 | 0.049 | 0.048 | 0.048 | 0.049 |
| Regenerated | 0.050 | 0.048 | 0.049 | 0.048 | 0.049 | 0.050 |
| C$_5$+, vol. percent: | | | | | | |
| Fresh | 74.3 | 74.2 | 75.1 | 74.3 | 73.9 | 74.7 |
| Regenerated | 73.6 | 74.2 | 74.1 | 74.8 | 73.9 | 73.8 |
| CH$_4$, s.c.f.b.: | | | | | | |
| Fresh | 108 | 102 | 96 | 97 | 96 | 98 |
| Regenerated | 118 | 102 | 100 | 99 | 103 | 103 |

As previously explained, the temperature required to make octane, at constant conditions for the same charge stock is a good measure of activity of the catalyst. On this basis, it can be determined from table IV that the regenerated catalyst required a temperature to make octane which was significantly lower than that used with the corresponding fresh catalyst—this indicates that the regenerated catalyst was more active than the fresh catalyst. This last result is quite unexpected and is one of the significant advantages associated with the present invention. This activity of the regenerated catalyst was especially noteworthy in view of the fact that the application of prior art burning techniques to this deactivated catalyst produced a regenerated catalyst which was considered to be substantially and permanently deactivated and to be of no further utility for reforming.

Similarly, $C_5+$ yield at octane is a precise indicator of catalyst selectivity for reforming reactions, and by comparing the $C_5+$ yield data given in table IV for the fresh catalyst with that for the regenerated catalyst, it is manifest that the regenerated catalyst has selectivity characteristics which are equivalent to the fresh catalyst.

Insofar as stability is concerned, the rate of change with time of temperature necessary to make octane and of $C_5+$ yield are commonly used to measure this performance characteristic. From table IV it can be ascertained that the stability characteristics for the fresh catalyst and the regenerated catalyst are comparable.

Accordingly, it is clear from the comparative data presented in table IV that the regeneration method of the present invention resulted in a regenerated catalyst possessing activity, stability, and selectivity characteristics that are equivalent or better than those possessed by the fresh catalyst.

I claim as my invention:

1. A method for regenerating a deactivated hydrocarbon conversion catalyst comprising a combination of a platinum group component, a rhenium component, a halogen component, and a sulfur component with an alumina carrier material, the catalyst having been deactivated by deposition of carbonaceous materials thereon during a previous contacting with hydrocarbon charge stock at hydrocarbon conversion conditions, said method comprising the sequential steps of:
   1. contacting the deactivated catalyst with a substantially sulfur-free first gaseous mixture consisting essentially of hydrogen, about 0.5 to about 2 mole percent $H_2O$, and HCl—the mole ratio of $H_2O$ to HCl contained therein being about 20:1 to about 100:1—at a temperature of about 350° to about 600° C. and at a pressure of about 1 to about 50 atmospheres for a period extending until the resulting effluent gas stream is substantially free of hydrogen sulfide;
   2. purging hydrogen from contact with the catalyst resulting from step (1) with an inert gas stream;
   3. subjecting the catalyst resulting from step (2) to contact with a substantially sulfur-free second gaseous mixture consisting essentially of an inert gas, $O_2$, $H_2O$, and HCl—the amount of $O_2$ being about 0.2 to about 3 mole percent thereof, the amount of $H_2O$ being about 0.5 to about 2 mole percent thereof and the mole ratio of $H_2O$ to HCl contained therein being selected from the range of about 20:1 to about 100:1—at a temperature of about 375° to about 450° C. and at a pressure of about 1 about 7 atmospheres for a period sufficient to substantially remove said carbonaceous materials;
   4. treating the catalyst resulting from step (3) with said second gaseous mixture for a period of about 0.5 to about 10 hours at a temperature of about 450° to about 550° C. and at a pressure of about 1 to about 7 atmospheres;
   5. purging oxygen from contact with the catalyst from step (4) with an inert gas stream; and
   6. subjecting the catalyst resulting from step (5) to contact with a substantially sulfur-free third gaseous mixture consisting essentially of hydrogen, about 0.5 to about 2 mole percent $H_2O$, and HCl—the mole ratio of $H_2O$ to HCl contained therein being selected from the range of about 20:1 to about 100:1—at a temperature of about 300° to about 600° C., for a final period of about 0.5 to about 5 hours, thereby producing a regenerated hydrocarbon conversion catalyst having activity, selectivity, and stability characteristics comparable to those possessed initially by the fresh catalyst.

2. A method as defined in claim 1 wherein said platinum group component is platinum or a compound of platinum.

3. A method as defined in claim 1 or the halogen component of or catalyst is chlorine or a compound of chlorine.

4. A method as defined in claim 1 wherein said alumina carrier material is gamma- or eta-alumina.

5. A method as defined in claim 1 wherein said catalyst contains, on an elemental and carbon-free basis, about 0.1 to about 1.5 wt. percent halogen, about 0.01 to about 1 wt. percent platinum group metal, about 0.1 to about 1 wt. percent rhenium, and about 0.05 to about 1 wt. percent sulfur.

6. A method as defined in claim 1 wherein the mole ratio of $H_2O$ and HCl utilized in steps (1), (3), (4) and (6) is selected from the range of about 50:1 to about 90:1

7. A method as defined in claim 1 wherein the temperature utilized in step (6) is about 325° to 452° C.

8. A method as defined in claim 1 wherein the inert gas stream used in step (2) contains $H_2O$ and HCl in a mole ratio of about 20:1 to about 100:1.

9. A method as defined in claim 1 wherein step (4) comprises the substeps of:
   a. treating the catalyst resulting from step (3) with said second gaseous mixture for about 0.5 to about 5 hours at a temperature of about 450° to about 550° C. and at a pressure of about 1 to about 7 atmospheres; and, thereafter,
   b. increasing the amount of $O_2$ contained in said second gaseous mixture by a factor of about two and continuing the treating for about 0.5 to about 5 hours at the same temperature and pressure.

10. A method as defined in claim 1 wherein the amount of oxygen contained in the second gaseous mixture is about 0.5 to about 1.5 mole percent thereof.

11. a method as defined in claim 1 wherein the period utilized in step (1) extends until the resulting effluent gas stream contains less than 1 vol. p.p.m. of $H_2S$.

12. A method as defined in claim 1 wherein the period utilized in step (3) extends until the differential temperature across the catalyst bed is less than 5° C.

* * * * *